May 25, 1943.  J. G. RAY  2,319,881
AIRCRAFT PICKUP AND DELIVERY APPARATUS
Filed April 24, 1940   4 Sheets-Sheet 1
Fig. I
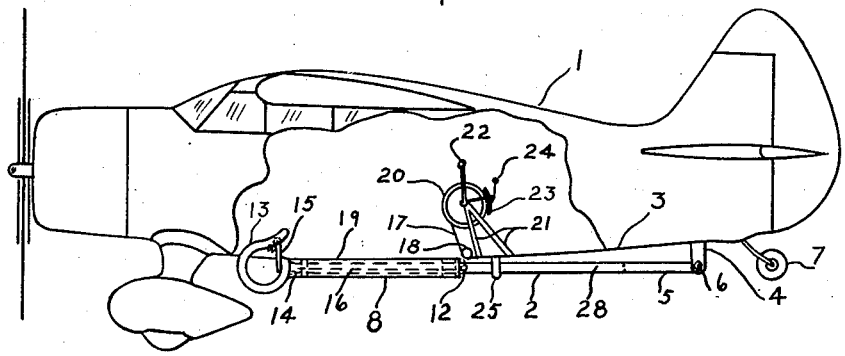
Fig. II
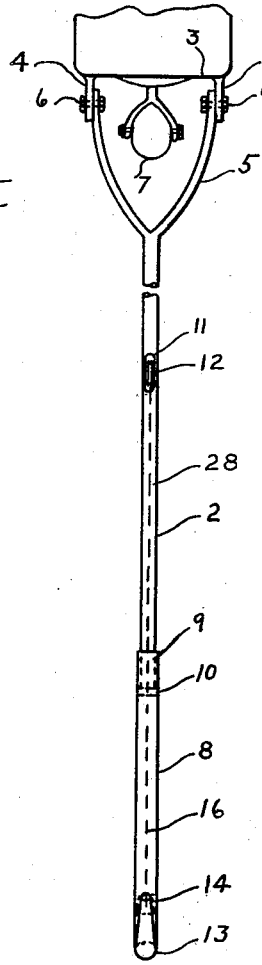
Fig. III
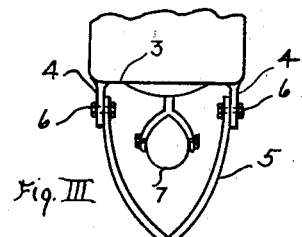
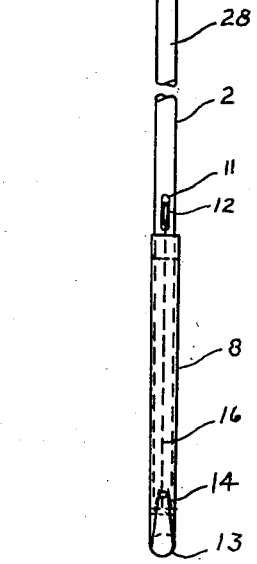
INVENTOR.
James G. Ray
BY
ATTORNEY

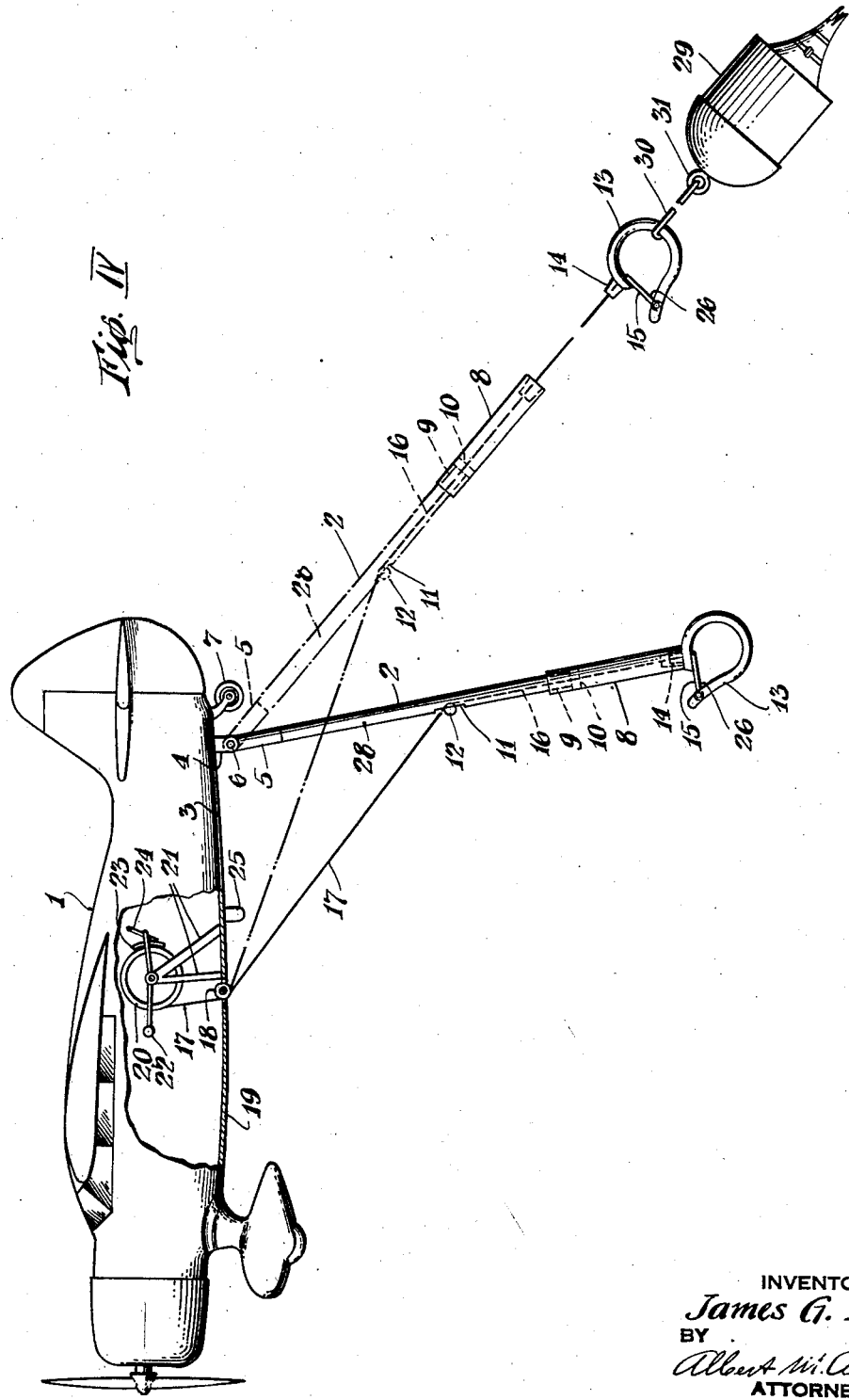

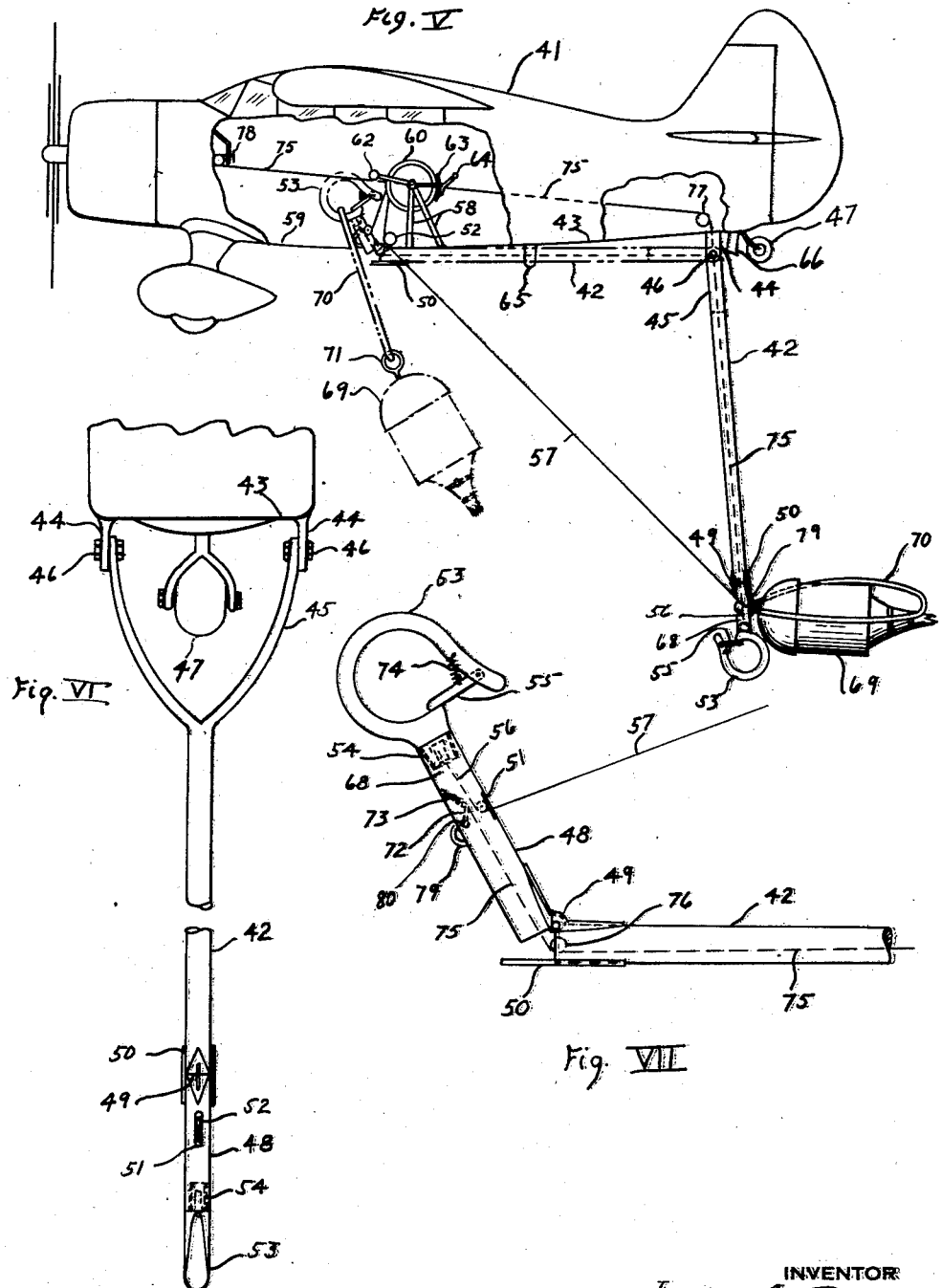

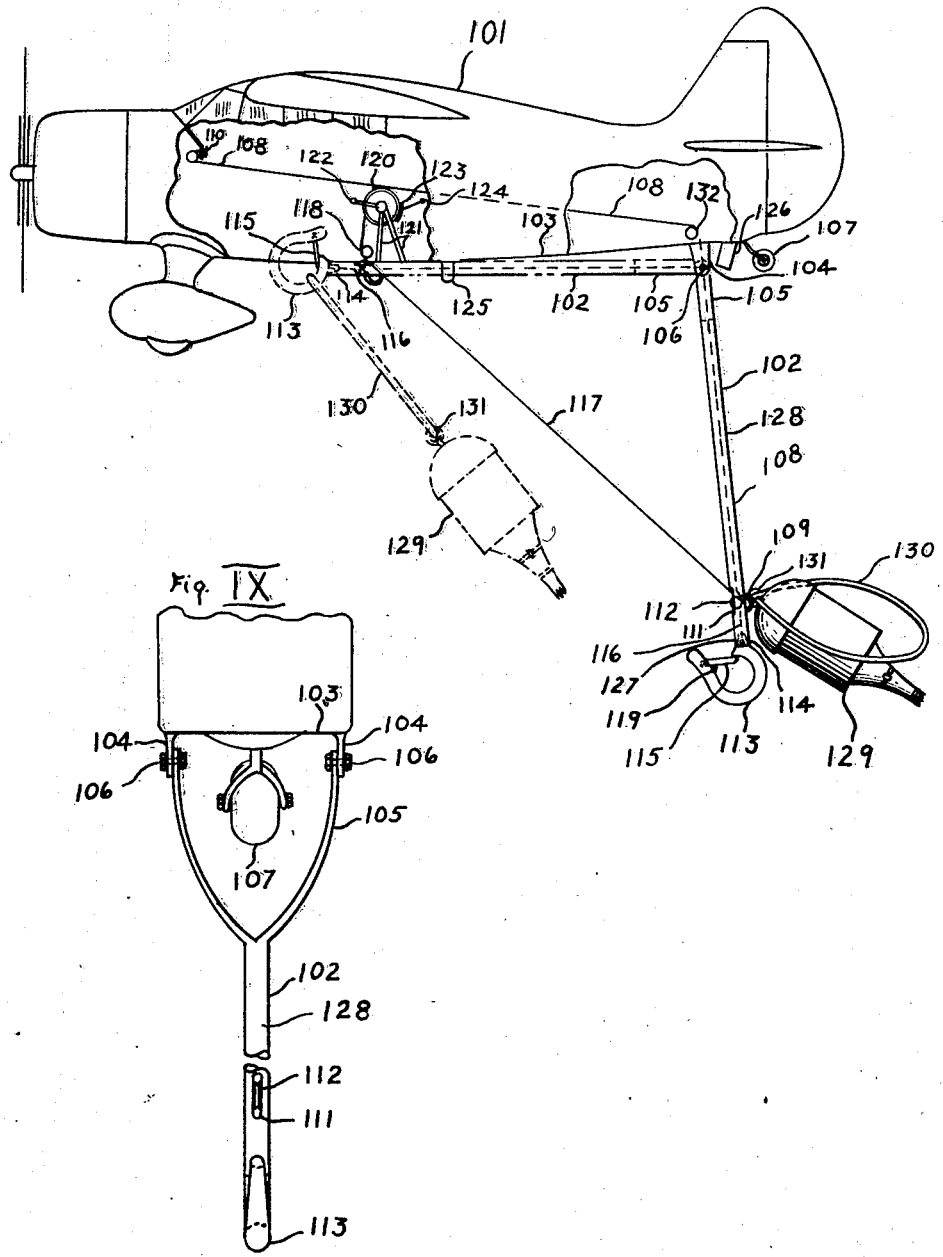

Patented May 25, 1943

2,319,881

UNITED STATES PATENT OFFICE 2,319,881

AIRCRAFT PICKUP AND DELIVERY APPARATUS

James G. Ray, Pittsburgh, Pa., assignor to All American Aviation, Inc., Wilmington, Del., a corporation of Delaware Application filed April 24, 1940, Serial No. 331,364

6 Claims. (Cl. 258—1)

The present invention relates to improvements in aircraft pick-up and delivery apparatus.

In a pick-up and delivery system of the type to which the present invention is adapted, a hook or like member is trailed from the aircraft by a transfer line and the aircraft is flown past a "ground station," at which the burden to be picked up is located, in order to engage the hook with the burden, or preferably, a pick-up line attached thereto. The burden is accelerated from a position of rest to the speed of the aircraft and therefore the forces which must be absorbed are very great, especially where the burden has substantial weight and the aircraft is traveling at a relatively high rate of speed.

It is desirable that the hook be guided with sufficient accuracy to engage the pick-up line and that it be under such degree of control as to prevent the transfer line from whipping about, both before and after the burden is engaged.

It is also desirable that the shock incident to engaging and accelerating the burden and its associated pick-up line be absorbed or dissipated without undue strain on the aircraft or the associated apparatus.

In the present invention a transfer or pick-up arm depending from the aircraft, and held in the desired position by suitable means such as by a transfer line, holds the hook in a fixed position relative to the aircraft until contact is made with the pick-up line to which the burden is attached. The arm is pivoted to the aircraft so that it may swing backward as the contact is made, thus absorbing at least a portion of the initial shock of striking the pick-up line. The pick-up line then slides down into the hook and, as the force of initially accelerating the burden is applied to the hook, the transfer line is permitted to pay out.

The aircraft end of the transfer line is attached to a winch carried by the aircraft, which winch preferably is relatively free to rotate at the time the arm strikes the pick-up line. Thus, when the arm swings back, it starts the winch rotating and as the load comes onto the hook, the winch is in motion and the initial inertia will have been overcome so as to prevent breaking the line. A brake may be provided in association with the winch to check the line evenly, as desired. When the line has been checked, the winch may then be rotated in a direction to wind in the line, and the arm is thus rotated into retracted position and the pick-up line attached to the burden may be readily brought into a hatch in the aircraft, removed from the hook, and the burden pulled into the aircraft.

A feature of the invention is that it increases the efficiency of pick-ups when made by aircraft while in flight.

A further feature of the invention is that it reduces to a minimum the hazards incident to making pick-ups in flight.

Another feature of the invention is that it provides a simple and efficient means for reducing the shock to the aircraft incident to making such pick-ups.

Still another feature of the invention is that it provides a means for preventing the burden or hook from striking the aircraft when a pick-up is made.

Although the novel features which are believed to be characteristic of this invention will be particularly pointed out in the claims appended hereto, the invention itself as to its objects and advantages, and the manner in which it may be carried out, may be better understood by referring to the following description taken in connection with the accompanying drawings forming a part hereof, in which Fig. I is a diagrammatic view showing an aircraft having associated therewith one form of pick-up apparatus constructed in accordance with the invention and with the transfer arm in retracted position against the aircraft;

Fig. II is an enlarged detail view of the transfer arm with the outer end portion in extended position;

Fig. III is an enlarged detail view of the transfer arm with the outer end portion in telescoped position;

Fig. IV is a side elevational view of the aircraft of Fig. I with the position of the transfer arm when in extended position ready for a pick-up being shown in full lines and the position after a pick-up shown in broken lines;

Fig. V is a view of a modified form of the invention, the extended position of the transfer arm being shown in full lines, and the retracted position in broken lines;

Fig. VI is an enlarged, front elevational view of the transfer arm of the apparatus shown in Fig. V;

Fig. VII is an enlarged, fragmentary view showing the outer end portion of the transfer arm;

Fig. VIII is a side elevational view of a further modified form of the invention; and Fig. IX is an enlarged, front elevational view of the transfer arm of the apparatus shown in Fig. VIII.

Like reference characters denote like parts in the several figures of the drawings.

One form of apparatus for accomplishing these ends comprises generally, as shown in Figs. I, II, III, and IV, a transfer arm 2, pivotally connected by a yoke 5 and pivot members 6, 6 to a bracket 4 on the underside of an aircraft 1.

The transfer arm 2 is provided with a telescoping outer end portion comprising an extension member 8 which has a bushing guide member 9 which telescopes with the arm 2 thereby guiding the telescoping extension member 8. The arm 2 may also be provided with an abutment member 10 which acts as a stop or abutment for the bushing 9, and also as a guide bearing for the telescoping extension member 8.

The transfer arm 2 is also provided with an opening 11 intermediate the yoke 5 and the abutment member 10. A sheave 12 may be rotatably mounted within the transfer arm 2 adjacent the opening 11. A transfer line 16 is trained over the sheave 12 and passes through a guideway 28 in the arm 2 and the telescoping extension section 8 and has one end fixed to a hook 13. The hook 13 is formed with a shank 14 adapted to enter a socket defined by the end of the guideway 28 at the end of the transfer arm 2 remote from the aircraft.

The part 17 of the line 16 which extends from the opening 11, leads to a winch 20 suitably mounted in the aircraft 1, as by struts or connecting members 21, 21. The part 17 of the line 16 preferably is trained around a sheave 18 adjacent an opening or hatch 19 in the underside 3 of the aircraft 1.

The winch 20 may have a brake 23, of any suitable construction, operated by a brake handle 24, to control paying out of the line 16. The winch 20 is provided with a handle 22 to wind in the line 16 and bring the arm 2 up into its retracted position against the underside of the aircraft 1. A suitable holding device 25 is provided for retaining the arm in retracted position. Winding in of the line 16 also retracts the telescoping section 8 to telescope over the arm 2 so that when the arm 2 is drawn up against the aircraft, the hook 13 lies directly under (or in certain cases enters) the opening 19. The hook 13 is thus in position to permit the operator to remove the pick-up line connected to the burden container 29 from the hook 13 after a pick-up has been made.

The burden container 29 preferably has a pick-up line 30 attached thereto as by an eye or ring 31.

In operation, the pick-up line 30 is suitably supported at the ground station in position to be engaged by the hook 13 and the aircraft is flown past the ground station at such height that the arm 2 or the part 17 of the transfer line, strikes the pick-up line 30 and detaches it from its supporting means. The impact of striking the pick-up line 30 causes the arm 2 to swing rearwardly about its pivot and the leverage exerted by the arm on the part 17 of the pick-up line sets the winch in motion. The impact is sufficient to release the means by which the pick-up line 30 is attached to its supporting means and thus the pick-up line and its attached burden are given an initial acceleration. However, owing to the rearward movement of the arm 2, the burden is not accelerated immediately to the full speed of the aircraft.

The pick-up line 30, after being released from its supporting means, slides down the arm 2 and is engaged by the hook 13 and the pull exerted by the burden on the grapple causes the transfer line to be under substantial tension, whereby it is drawn out. The winch continues to rotate to allow the transfer line to pay out. Owing to the fact that the winch has been initially set in motion, the strain on the transfer line when the grapple engages the pick-up line is considerably less than it would be if the winch were stationary at this time.

The paying out of the transfer line can be controlled by suitable manipulation of the brake 23 by the operator to gradually decrease the speed of rotation of the winch and gradually bring the burden up to the speed of the aircraft. The winch is then rotated in the opposite direction to wind in the transfer line and bring the grapple and the attached burden up to the end of the arm 2. Thereafter, further winding in of the transfer line causes the telescoping end portion to telescope onto the main portion of the arm 2 until the stop or abutment is reached. Still further winding in of the transfer line causes the arm 2 to rotate forwardly about its pivot and to bring the hook and attached burden pick-up line into position adjacent the hatch or opening in the aircraft, whereupon the operator can remove the pick-up line from the hook, and bring the burden into the aircraft.

The position of the transfer arm at the time of making the pick-up can be controlled by the transfer line and winch. While it is desirable that the transfer arm be maintained in nearly vertical position, it should be inclined rearwardly slightly in order to prevent it from transmitting an axial thrust force to the aircraft when the shock of pick-up occurs.

By the provision of a telescoping transfer arm, such as illustrated, the distance of the hook (when in position for a pick-up) from the aircraft may be made substantially greater than tne distance from the pivot point of the arm to the hatch. Thus, the effective length of the arm need not be limited by the size of the aircraft as would be the case if a non-collapsible arm were used, and hence the arm can be employed with a relatively small aircraft.

In Figs. V, VI and VII there is shown a modified form of the invention in which an aircraft 41 has an arm 42 hingedly connected to the underside 43 thereof as by the bracket 44, yoke 45 and pivotal connecting members 46, 46. The arm 42 is provided with a yoke 45 similar to the yoke shown in Figs. I to IV. The arm 42 has an extension 58 which is hingedly connected to the arm by an elbow 49, and an abutment member 50 is provided in the arm which permits the extension 48 to bend in a forward direction only. A line 56 passes over a sheave 52 in an opening 51 in the extension 48, and thence through a guideway 68 in the extension 48, and is secured to the shank 54 of a hook 53.

Another part 57 of the line 56 passes around a sheave 52 in the underside 43 of the aircraft 41, and thence to a winch 60. The winch 60 is provided with a handle 62 for rotating the winch and winding or unwinding the line 56. It may also be provided with a brake 63 actuated by the brake handle 64 to control the paying out of the line 56. The winch 60 is affixed to the fuselage of the aircraft by connecting members 58, 58.

The extension 48 of the arm 42 is provided with a pivoted burden release member 72, which is actuated by a burden release line 75. The burden release line 75 passes through a guideway 68 in the extension 48 and the guideway 68 in the arm 42 and around a sheave 77 in the aircraft 41, and thence to a burden release control member 78, which is preferably located on the instrument panel of the aircraft and adjacent the throttle control for the aircraft.

At a point on the underside 43 of the aircraft and forward of the bracket 44 is located a catch or retaining member 65, and just forward of this in the underside 43 of the aircraft 41 there is located an opening 59 which is approximately equal in diameter to the length of the extension 48.

A burden container 69 with a burden line 70 connected thereto by a member 71 may be releasably connected to the burden release member 72 by the member 71 which is located in the forward part of the burden container 69.

A stop member 66 may be provided adjacent the tail wheel 47 to prevent the arm 42 from swinging backward far enough to strike the aircraft when a pick-up is made.

The release member 72 comprises generally the curved finger piece 79 hingedly connected to the extension 48 as at 80. The finger piece 79 is held yieldingly in closed position against the extension 48 by suitable means such as the spring 73, so as to securely retain the burden. The control cable 75 serves to trip the burden release member to release the burden when desired.

The burden release device is employed when it is desired to deliver a burden either at the same time as a pick-up is made or as an independent operation. In making a delivery, the aircraft is flown past the ground station and at the proper instant, the burden release member is actuated by the control cable 75 to free the burden and allow it to drop to the ground.

In Figs. VIII and IX there is shown a further embodiment of the invention wherein a simplified form of arm is employed.

In this form of the device, the airplane 101 has a pick-up arm 102 hingedly attached thereto as by a yoke 105, bracket 104 and pivotal connections 106, 106.

The arm 102 is provided with a sheave 112 in an opening 111 in its forward portion at the desired distance from its point of connection.

A hook 113 is adapted to have its shank 114 fit up into a guideway 127 and has a pick-up line 116 attached thereto. The line 116 is trained over the sheave 112 and the part 117 passes thence over a sheave 118 in the underside 103 of the aircraft 101.

The other end of the line 116 is secured to a winch 120 which in turn is fastened to the aircraft 101 by suitable means such as the struts 121, 121. The winch 120 is provided with a winch operating handle 122 and a brake 123 controlled by the brake handle 124.

A spring retainer clamp 125 may be provided on the underside 103 of the aircraft 101 to hold the pick-up arm 102 in reposed position.

A burden release member 109 similar to those shown in Figs. V and VII may be provided, having a control line 108 connected thereto and passing through a longitudinal guideway 128 up over a pulley 132 and thence to a control knob 110.

A stop member 126 may be provided adjacent the tail-wheel 107 to limit movement of the pick-up arm 102.

While several forms of the device have been shown the operation and principles applicable thereto are generally analogous.

It is to be understood that where the term "line" is used herein, it is intended to designate any suitable member, such as a rope, wire, cable or the like of sufficient strength and flexibility to perform the intended functions.

While certain novel features of the invention have been disclosed herein, and are pointed out in the annexed claims, it will be understood that various omissions, substitutions and changes may be made by those skilled in the art without departing from the spirit of the invention.

What is claimed is:

1. In combination with an aircraft, a telescoping pick-up arm hingedly connected to the underside of said aircraft adjacent the rearward portion thereof, an opening in said arm, a sheave mounted in said arm adjacent said opening, an opening in the underside of said aircraft, a second sheave mounted in the underside of said aircraft adjacent said opening, a passageway through said pick-up arm, a winch carried by said aircraft, a brake associated with said winch, an operating member for said winch, a line connected at one end to said winch and trained over said sheaves and through said pick-up arm, and a hook connected to the other end of said line.

2. In combination with an aircraft having a hatch, a telescoping pick-up arm comprising telescoping upper and lower sections, said upper section being hingedly connected to said aircraft, said lower section having a guide, a second guide mounted on said aircraft adjacent said hatch, a winch carried by said aircraft, an operating member for controlling said winch, a line connected to said winch and trained over said guides, and a hook connected to said line whereby said line controls the telescoping of said sections and the angular position of said arm.

3. In an air pick-up system, an aircraft, a pick-up arm, hinge means connecting said arm to said aircraft, a guide and a seat on said arm, a pick-up device releasably engaging said seat, take-up means carried by said aircraft, a guide device on said aircraft spaced from said hinge means, a line connected to said take-up means, passing over said guide device, through said arm guide and connected to said pick-up device, said arm guide being located at a substantial distance from the hinged end of the arm, said guide device and said arm guide being constructed to maintain engagement of the line therewith during the pick-up operation, whereby said line serves to control the position of said arm in readiness for the pick-up operation, to return said pick-up device and to move said arm to inoperative position after the pick-up operation.

4. In combination with an aircraft having a hatch, a pick-up arm comprising upper and lower sections, articulative means spaced from said hatch for connecting said upper section to said aircraft, movable means connecting said upper and lower sections, a holder in the end of said lower section, a hook adapted to seat in said holder, a guide on said arm, a winch in said aircraft adjacent said hatch, a pick-up line wound on said winch passing through said guide and seat and attached to said hook, said winch being adapted to wind and unwind said pick-up line whereby to aid in controlling the position of said arm prior to the pick-up operation, and whereby to reseat said hook in said holder and to swing said arm into retracted position adjacent the aircraft with said hook adjacent said hatch after picking up the burden.

5. In combination with an aircraft having a hatch, a pick-up arm comprising upper and lower sections, articulative means spaced from said hatch for connecting said upper section to said aircraft, articulative means for connecting said upper and lower sections, a guide on said lower section, a holder at the end of said lower section, a pick-up hook adapted to seat in said holder, a winch in said aircraft, a pick-up line wound on said winch passing through said guide and attached to said hook, said winch being adapted to wind and unwind said pick-up line, whereby to aid in controlling the operative position of said pick-up arm prior to the pick-up operation, and whereby to swing said arm into inoperative position with said upper section adjacent the aircraft and said lower section and hook projected through said hatch into the interior of the aircraft after picking up the burden.

6. In combination with an aircraft having a hatch in its lower side, a pick-up arm comprising upper and lower sections, pivot means spaced aft of said hatch for connecting said upper section to said aircraft, pivot means for connecting said upper and lower sections, a receptacle in the end of said lower section, a hook adapted to seat in said receptacle, said lower section having a guide opening communicating with said receptacle, a winch in said aircraft, a line wound on said winch passing through said guide opening and attached to said hook, said winch being adapted to wind and unwind said pick-up line whereby to aid in controlling the operative position of said arm prior to the pick-up operation, and whereby to swing said arm forward into inoperative position with said upper section adjacent the aircraft and said lower section and hook projected through said hatch into the interior of the aircraft after picking up the burden.

JAMES G. RAY.